(12) United States Patent
Nasre

(10) Patent No.: US 8,346,732 B1
(45) Date of Patent: Jan. 1, 2013

(54) METHOD AND APPARATUS FOR PROVIDING HIGH AVAILABILITY OF A DATABASE

(75) Inventor: Rupesh Nasre, Maharashtra (IN)

(73) Assignee: Symantec Operating Corporation, Mountain View, CA (US)

( * ) Notice: Subject to any disclaimer, the term of this patent is extended or adjusted under 35 U.S.C. 154(b) by 1436 days.

(21) Appl. No.: 11/291,025

(22) Filed: Nov. 30, 2005

(51) Int. Cl.
*G06F 17/30* (2006.01)

(52) U.S. Cl. ..................................................... 707/674

(58) Field of Classification Search ........................ None
See application file for complete search history.

(56) References Cited

U.S. PATENT DOCUMENTS

| | | | |
|---|---|---|---|
| 6,434,568 B1 * | 8/2002 | Bowman-Amuah | 1/1 |
| 6,496,850 B1 * | 12/2002 | Bowman-Amuah | 709/203 |
| 6,571,282 B1 * | 5/2003 | Bowman-Amuah | 709/219 |
| 6,615,253 B1 * | 9/2003 | Bowman-Amuah | 709/219 |
| 6,640,244 B1 * | 10/2003 | Bowman-Amuah | 709/207 |
| 7,246,159 B2 * | 7/2007 | Aggarwal et al. | 709/220 |
| 7,644,087 B2 * | 1/2010 | Barkai et al. | 707/770 |
| 2003/0154236 A1 * | 8/2003 | Dar et al. | 709/201 |
| 2005/0144082 A1 * | 6/2005 | Coolman et al. | 705/26 |

OTHER PUBLICATIONS

Fox, Armando, "A Framework for Separating Server Scalability and Availability From Internet Application Functionality," 1998, Department of Computer Science, University of California, Berkley, pp. 1-177.*

Zhu, Wei-Dong, et al., "Content Manager OnDemand Backup, Recovery, and High Availability," Oct. 2005, IBM Redbooks, First Edition, pp. 1-384.*

Sultan, Forin, et al., "Nonintrusive Failure Detection and Recovery for Internet Services Using Backdoors," 2003, Department of Computer Science, Rutgers University, pp. 1-20.*

Marcus, Evan., et al., "Blueprint for High Availability, " 2003, Wiley Publishing, Second Edition, pp. 1-618.*

Hoerlein, Jon, "Exchange Server 2003 High Availability Guide", *Microsoft Windows Server System*, May 2004, http://www.microsoft.com/technet/prodtechnol/exchange/2003/library/highavailgde.mspx, pp. 1-147.

"Neverfail for Exchange", http://www.neverfailgroup.com/products/nfexchange.asp.

SteelEye® Technology Inc., "Data and Application Availability Management", *LifeKeeper® for Exchange*, http://www.steeleye.com/pdf/literature/lifekeeper_for_exchange-solution_brief-052303.pdf.

XOsoft™ Just Keep Working, "WANSync^HA Exchange", http://www.xosoft.com/products/f_WANSyncHAExchange.shtml.

http://www.f5.com/solutions/applications/email/Microsoft_Exchange_solutionbrief.pdf.

* cited by examiner

*Primary Examiner* — Farhan Syed

(74) *Attorney, Agent, or Firm* — Campbell Stephenson LLP

(57) ABSTRACT

A method and apparatus for providing high availability of a database. A first front end server is coupled to a first back end server, and a second front end server is coupled to a second back end server. The second front end server provides redundancy to the first front end server and the second back end server provides redundancy to the first back end server. The front end servers function as a gateway into the database and comprise protocol services for processing input/output requests to the gateway. The back end servers comprise database protocol services and interface directly to the gateway to retrieve information requested by the processed database requests received from the front end servers.

13 Claims, 3 Drawing Sheets

METHOD AND APPARATUS FOR PROVIDING HIGH AVAILABILITY OF A DATABASE

SUMMARY OF THE INVENTION

1. Field of the Invention

The present invention generally relates to a high availability network and, more particularly, to a method and apparatus for providing high availability of a database on a storage area network.

2. Description of the Related Art

Networked computer systems enable users to share resources and services. One computer can request and use resources or services provided by another computer. The computer requesting and using the resources or services provided by another computer is typically known as a client, and the computer providing resources or services to another computer is known as a server.

High-availability computer systems are desirable for many workplace environments. Such high-availability systems need to detect and recover from a failure in a way transparent to its users. For example, if a server in a high-availability system fails, the system should detect and recover from the failure with no or little impact on clients.

Typically, in a high availability computer system, servers are organized in a cluster. Upon failure of any server in a cluster, one or more or other servers will perform the tasks of the failed server. The transition from the failed server to the replacement servers is known as a failover. Rapidly performing a failover is critical to the operation and efficiency of a server cluster. The transition should occur such that users are not impacted.

Mission-critical software directly or indirectly affects revenue, the ability of an employee to deliver service to a customer, or the ability of an employee to complete a work assignment. Dependence on databases and electronic communication has become more prevalent in our society and it is increasingly important to achieve the goal of continuous availability of such mission-critical software applications.

An example of mission-critical software that requires high-availability is user collaboration software, such as MICROSOFT Exchange Server. MICROSOFT Exchange Server provides a collaborative work environment for businesses. The software enables multiple users to send and receive electronic mail, have common calendars, collaborate on tasks, access databases, and provides other forms of interactive communication through a computer network. MICROSOFT Exchange Server accommodates user access through support for Post Office Protocol 3 (POP3), Internet Message Access Protocol 4 (IMAP4), Simple Mail Transfer Protocol (SMTP) and web browser-based access clients. For many businesses, it is critical to the productivity of the business to have MICROSOFT Exchange Server or similar collaboration software to be operational at all times.

The operating system that runs MICROSOFT Exchange Server utilizes a registry key known as "ActiveComputerName". The ActiveComputerName registry key is critical to the function of many MICROSOFT applications. Applications that require the ActiveComputerName registry key to function include MICROSOFT Exchange Server and Windows Management Instrumentation. The ActiveComputerName registry key is utilized by MICROSOFT Exchange Server to associate an Exchange database with a specific host on which the Exchange database resides. Servers that access the MICROSOFT Exchange Server maintain a list of the ActiveComputerName registry keys and each associated Exchange database. A server accesses the desired Exchange database by connecting to the host named in the ActiveComputerName registry key. If the host is part of a server cluster, upon failure of the host, the ActiveComputerName registry key will require updating. Changing the name of the host in the ActiveComputerName registry key may render the Exchange database unavailable to the server because the changed name is not present on the list of ActiveComputerName registry keys and associated Exchange databases. The Exchange database will continue to be unavailable until the new ActiveComputerName registry key name is registered with the server.

Thus, there is a need in the art to provide for the high-availability of databases and electronic communication systems without negatively impacting the ability of a user to access such a system. Further, there is a need in the art to provide for the high-availability of a MICROSOFT Exchange Server without requiring a change to the ActiveComputerName registry key.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The present invention is a method and apparatus for providing high availability access to a database. A user interfaces with the database through a client computer. The client computer is connected to a layer of front end servers via a communications network. The front end servers virtualize database access such that access to the database independent of any one specific front end server.

The front end servers function as a gateway into the database. The front end servers comprise protocol services for processing database access requests from the client computers. The processed database access requests are transferred to a layer of back end servers. The back end servers comprise database protocol services for interfacing with the database. The database is stored on a storage area network. The front end servers and the back end servers are independent of each other. Appropriate failover procedures ensure high availability of the front end servers and the back end servers, providing high availability access to the database by the user. When utilizing an Exchange database, the failover procedure is accomplished without changing the name set in the ActiveComputerName registry key, nor requiring re-registration of the ActiveComputerName registry key.

Figure 1:
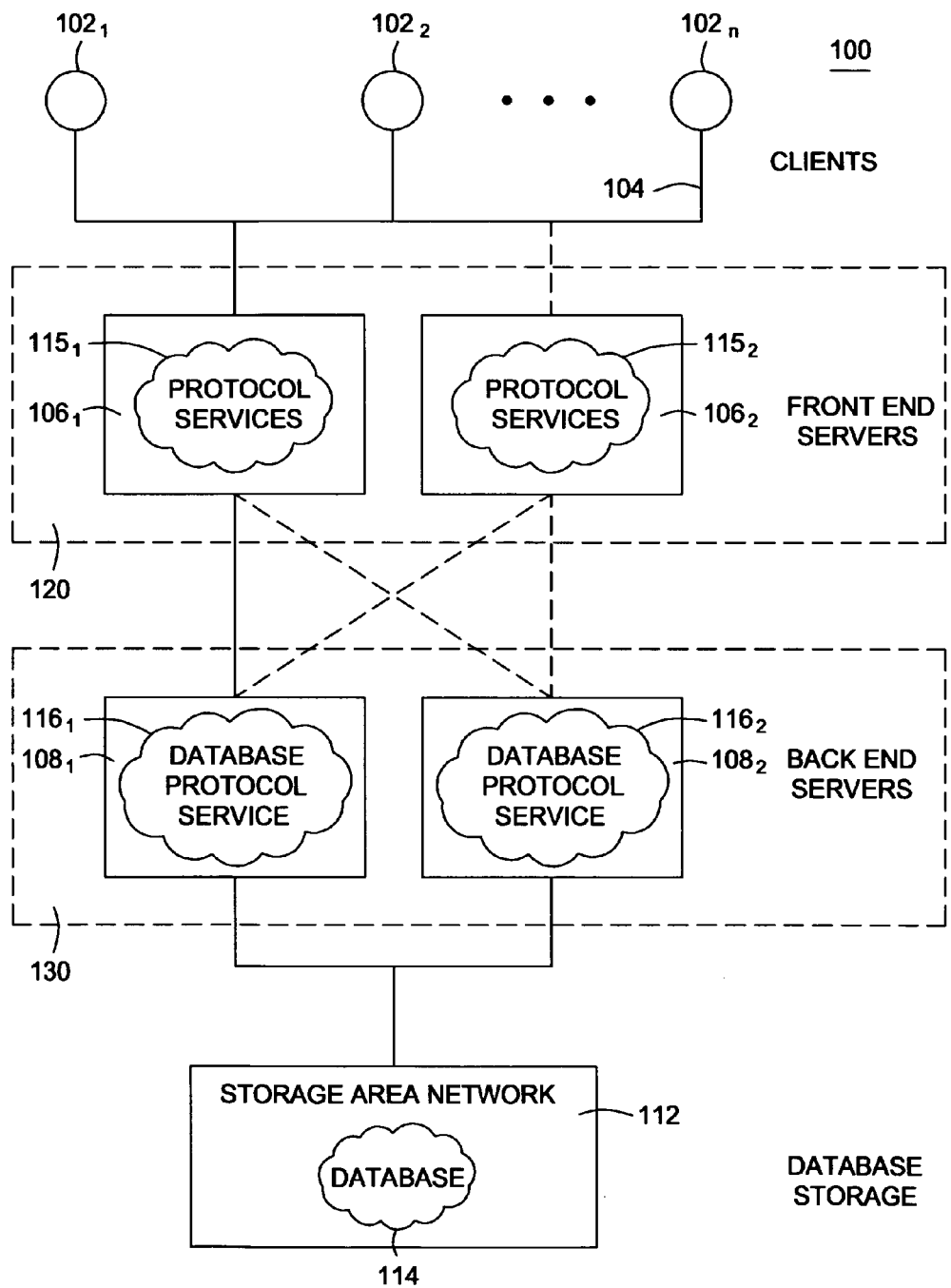
FIG. 1 is a block diagram of a computer network that utilizes one embodiment of the present invention.

FIG. 1 illustrates a server network 100 in which one embodiment of the present invention may be utilized. The server network 100 comprises client computers $102_1$ to $102_n$, a communications network 104, front end servers $106_1$ and $106_2$ forming front end server layer 120, back end servers $108_1$ and $108_2$ forming back end server layer 130, and a storage area network 112. The communications network 104 may be any conventional network, such as an Ethernet network or a fiber channel network. For the sake of simplicity, two front end servers $106_1$ and $106_2$ and two back end servers $108_1$ and $108_2$ are shown. Those skilled in the art will understand that a plurality of front end servers 106 and/or a plurality of back end servers 108 may be connected together via the communications network 104 to form a larger network.

The client computers 102 are connected to the front end servers 106 via the communications network 104. The front end servers 106 comprise protocol services 115. The protocol services 115 comprise Simple Mail Transfer Protocol (SMTP), Post Office Protocol 3 (POP3), and Internet Message Access Protocol 4 (IMAP4). The front end servers 106 are coupled to the back end servers 108. A client computer 102 interfaces to a first front end server $106_1$ and requests information from the database 114. The front end server $106_1$ is connected to a back end server $108_1$ and passes the input/output request to the back end server $108_1$.

The back end server $108_1$ comprises database protocol services 116. In one embodiment of the invention, the database protocol services 116 comprise protocols used to access databases used in a collaborative manner such as MICROSOFT Exchange protocols, including System Attendant and Information Store.

The first front end server $106_1$ is connected to the second front end server $106_2$, and the first front end server $106_1$ is also connected to the first back end server $108_1$. The first back end server $108_1$ is connected to the second back end server $108_2$. On failover, the first front end server $106_1$ is failed over to the second front end server $106_2$. The first back end server $108_1$ can also failover to the second back end server $108_2$.

Access to the database 114 is provided by a two-layered system of servers. The first layer of servers 120 is comprised of a plurality of front end servers 106. The front end servers 106 virtualize the ActiveComputerName registry key of an Exchange database and comprise protocol services 115 to handle input/output requests to the database 114. The front end servers 106 do not interface directly with the database 114, but pass input/output requests for the database 114 to the second layer of servers 130.

The second layer of servers 130 is comprised of a plurality of back end servers 108. The back end servers 108 receive the input/output requests to the database 114 from the front end servers 106. The back end servers 108 comprise database protocol services 116 and interface directly with the database 114. In one embodiment of the invention, the back end servers are stand-alone individualized servers. The back end servers 108 utilize the database protocol services 116 to access and retrieve information from the database 114. The database 114 is stored on the storage area network 112.

The first back end server $108_1$ transfers the requested data to the first front end server $106_1$. The first front end server $106_1$ receives the requested data and transfers the requested data to the client computer 102. The interface for requesting data from the database provided by the client computer 102, and the gateway into the database provided by the first front end server $106_1$ are kept separate and independent from the first back end server $108_1$.

In the event of a failure of the front end server $106_1$, an appropriate failover procedure is initiated. An exemplary failover procedure is disclosed in commonly assigned U.S. patent application titled "METHOD AND APPARATUS FOR DETECTING SYSTEM FAILURE AND INITITIATING A FAILOVER PROCEDURE", Ser. No. 11/239,900, filed on Sep. 30, 2005, which is hereby incorporated by reference in its entirety. Using the failover procedure, the system state is migrated from the first front end server $106_1$ to the second front end server $106_2$. The system state comprises input/output requests, database access requests, a variety of checkpoint data, application status and data stored in the memory of the front end server $106_1$. Since the front end servers do not perform database accesses, the failover procedure does not change the ActiveComputerName registry key of the first or second front end servers $106_1$/$106_2$ or require re-registration of the ActiveComputerName registry key.

High availability of the back end servers 108 is also provided by an appropriate failover procedure. An exemplary failover procedure is disclosed in commonly assigned U.S. patent application titled "METHOD AND APPARATUS FOR DETECTING SYSTEM FAILURE AND INITITIATING A FAILOVER PROCEDURE", Ser. No. 11/239,900, filed on Sep. 30, 2005, which is hereby incorporated by reference in its entirety. In one embodiment of the invention, a successful failover is achieved by migrating mailboxes, private databases, public databases, storage groups and transaction logs from the first back end server $108_1$ to the second back end server $108_2$. The database 114 is re-associated with a functioning back end server by dismounting the volume containing the database 114 from a failed back end server and remounting the database on the functioning back end server.

In the event that the first front end server $106_1$ and the first back end server $108_1$ fail simultaneously, both servers $106_1$ and $108_1$ failover. Processed database access requests are transferred through the second front end server $106_2$ to the second back end server $108_2$.

Figure 2:
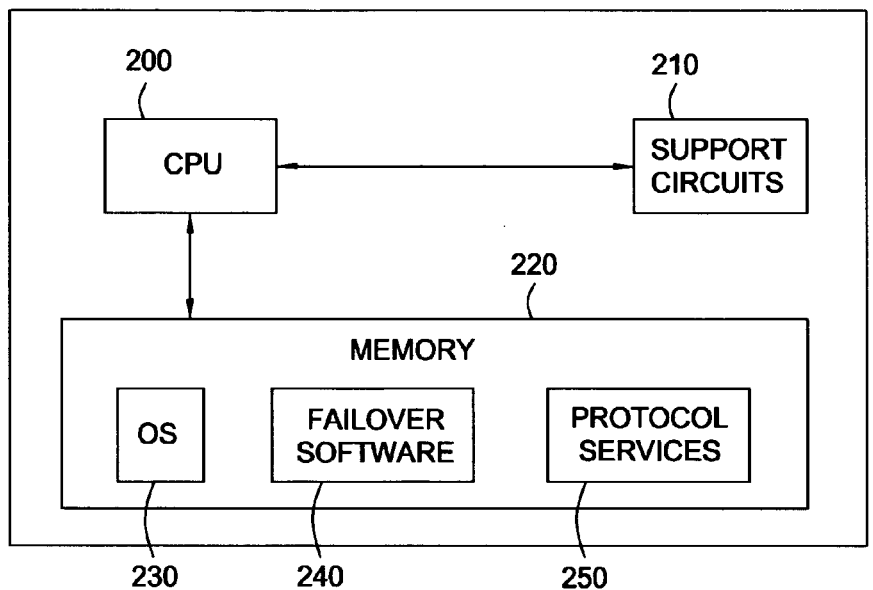
FIG. 2 is a block diagram of a front end server.

FIG. 2 is a block diagram of a front end server 106. The front end server 106 may be any type of computer or device on the network that manages protocol resources for accessing a database. In one embodiment, the source server 106 is dedicated to the support of and providing access to MICROSOFT Exchange in a network environment. The source server 106 comprises at least one central processing unit (CPU) 200, support circuits 210, and memory 220. The CPU 200 may comprise one or more conventionally available microprocessors and/or microcontrollers. The support circuits 210 are well known circuits that are used to support the operation of the CPU 200. These circuits comprise power supplies, clocks, input/output interface circuitry, cache and the like.

Memory 220 may comprise random access memory, read only memory, removable disk memory, flash memory, optical storage and various combinations of these types of memory. The memory 220 is sometimes referred to as main memory and may in part be used as cache memory or buffer memory. The memory 220 stores various forms of software and files, such as a an operating system (OS) 230, failover software 240, and protocol services 250. The failover software 240 is responsible for synchronizing the first front end server $106_1$ with the second front end server $106_2$ (e.g., migrating the system state, protocol services 250 and input/output requests received from the client computers 102) to provide a continuously available interface to the client computers 102. The protocol services 250 comprise Simple Mail Transfer Protocol (SMTP), Post Office Protocol 3 (POP3), and Internet Message Access Protocol 4 (IMAP4).

Figure 3:
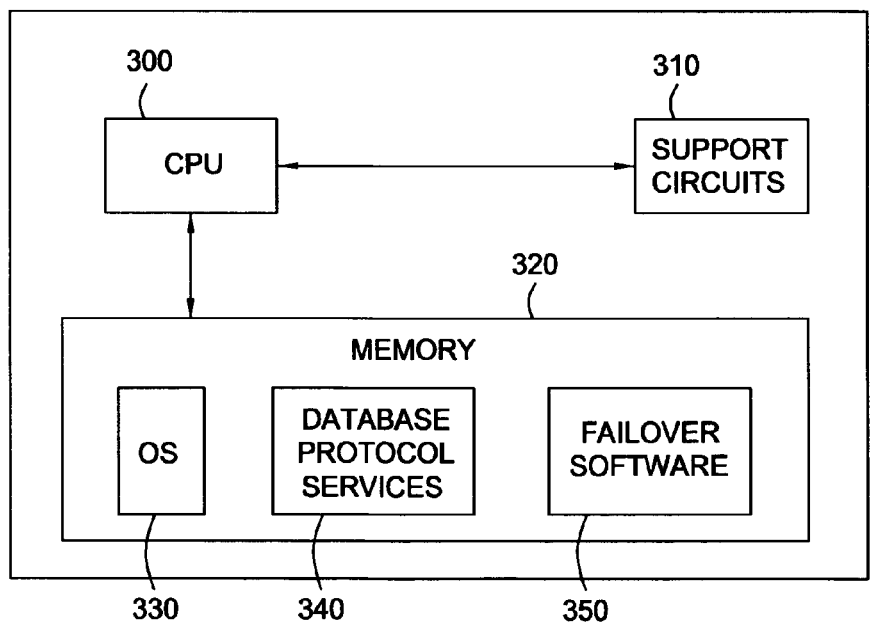
FIG. 3 is a block diagram of a back end server.

FIG. 3 is a block diagram of a back end server 108. The back end server 108 comprises at least one central processing unit (CPU) 300, support circuits 310, and memory 320. The CPU 300 may comprise one or more conventionally available microprocessors and/or microcontrollers. The support circuits 310 are well known circuits that support the CPU 300. These circuits comprise power supplies, clocks, input/output interface circuitry, cache and the like.

Memory 320 may comprise random access memory, read only memory, removable disk memory, flash memory, optical memory and various combinations of these types of memory. The memory 320 is sometimes referred to as main memory and may in part be used as cache memory or buffer memory. The memory 320 stores various software and files, such as an operating system (OS) 330, database protocol services 340, and failover software 350. The failover software 350 is responsible for synchronizing the first back end server $108_1$ with the second back end server $108_2$ (e.g., migrating the database protocol services 340 and input/output requests received from the front end servers 106) to provide continuously availability between the front end servers 106. The database protocol services 340 interface with the database to retrieve information requested by the front end servers.

The back end servers 108 are connected to a storage area network 112. The storage area network comprises a database 114. The database 114 may comprise any information store volume or file that contains data. In one embodiment, the database 114 is a MICROSOFT Exchange information store volume containing various pages of Exchange data, including Mailbox and Public Folder information.

Figure 4:
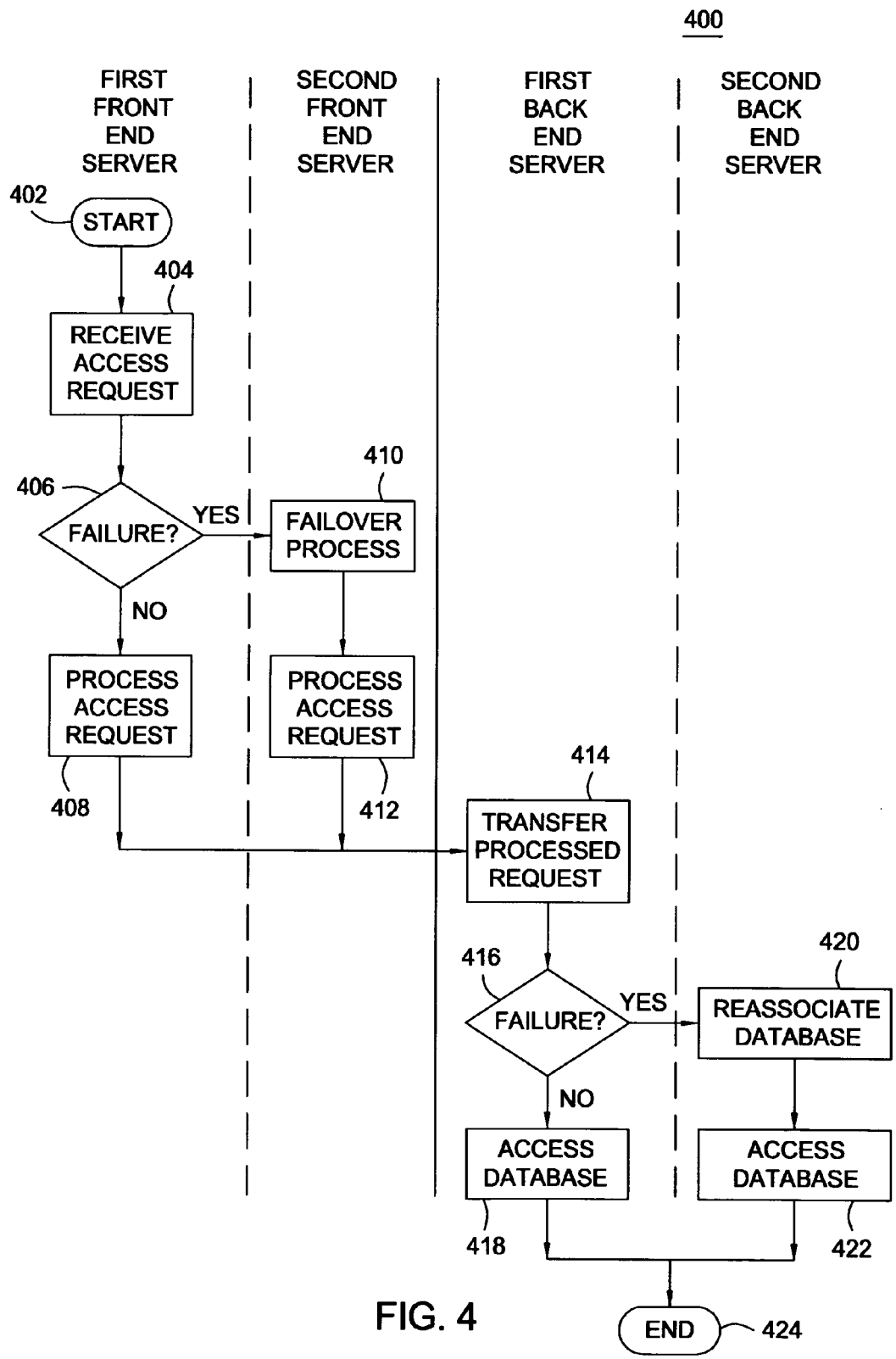
FIG. 4 is a flow diagram of a method of accessing a high-availability database in accordance with one embodiment of the present invention.

FIG. 4 is a flow diagram of a method of accessing a high-availability database 114 in accordance with one embodiment of the present invention. The method 400, starts at step 402 and proceeds to step 404. At step 404, a first front end server $106_1$ receives a database access request. At decision step 406, the first front end server $106_1$ is continuously monitored for failure. If a failure is detected, then the method 400 proceeds to step 410 wherein any appropriate failover procedure may be utilized.

An exemplary failover procedure is disclosed in commonly assigned U.S. patent application titled "METHOD AND APPARATUS FOR DETECTING SYSTEM FAILURE AND INITITIATING A FAILOVER PROCEDURE", Ser. No. 11/239,900, filed on Sep. 30, 2005, which is hereby incorporated by reference in its entirety. After failover step 410, the second front end server $106_2$ assumes the role of the first front end server $106_1$. At step 412, the second front server $106_2$ processes the database access request.

The method 400 proceeds to step 408 if a failure of the first front end server $106_1$ is not detected. At step 408, the first front end server $106_1$ processes the database access request.

At step 414, the processed database request from steps 408/412 is transferred to a first back end server. At decision step 416, the first back end server $108_1$ is continuously monitored for failure. An exemplary failover procedure is disclosed in commonly assigned U.S. patent application titled "METHOD AND APPARATUS FOR DETECTING SYSTEM FAILURE AND INITITIATING A FAILOVER PROCEDURE", Ser. No. 11/239,900, filed on Sep. 30, 2005, which is hereby incorporated by reference in its entirety. If a failure is detected, then the method proceeds to step 420. At step 420, the database 114 is re-associated from the first back end server $108_1$ to a second back end server $108_2$.

In one embodiment of the invention, the database 114 comprises MICROSOFT Exchange. The back end servers $108_1$ and $108_2$ function as MICROSOFT Exchange servers. Re-association of the database 114 comprises re-association of mailboxes, private databases, public databases, storage groups and transaction logs from a first back end server $108_1$ to a second back end server $108_2$. Re-association of the database 114 is accomplished by dismounting the volume containing the database 114 from the first back end server $108_1$ and remounting the database on the second back end server $108_2$. Re-association of the database does not involve changing the name set in the ActiveComputerName registry key or any re-registration of the ActiveComputerName registry key.

After re-association of the database, the method proceeds to step 422. At step 422, the second back end server $108_2$ accesses the database 114.

The method proceeds to step 418 if failure of the first back end server $108_1$ is not detected. At step 418, the first back end server $108_1$ accesses the database 114.

The method ends at step 424 after the first back end server $108_2$ or the second back end server $108_2$ accesses the database 114.

The benefit of the present invention is provided by not requiring a change in the ActiveComputerName registry key for the front end servers nor the backend servers. Prior solutions require a change in the ActiveComputerName registry key which can cause critical MICROSOFT applications to cease functioning and/or significant delays in completing a failover process.

The front end servers implement Exchange Protocol Services. The Exchange Protocol Services do not depend upon the ActiveComputerName registry key to function. The front end servers may be virtualized within a cluster and the ActiveComputerName registry key set to a virtual name for all of the front end servers within the cluster. Since the Exchange Protocol Services do not depend on the name set in the ActiveComputerName registry key, there is no requirement to change the registry key upon failover. The front end servers may be virtualized for other reasons, such as high availability of the front end servers, but it is not necessary to do so.

The back end servers implement MICROSOFT Exchange Database Protocol Services. The Exchange Database Protocol Services depend on the ActiveComputerName registry key to function properly. In one embodiment, the back end servers are identified by separate physical MICROSOFT Exchange Servers having separate Exchange installations. The ActiveComputerName registry key is set to a virtual name, the same name given to the MICROSOFT Exchange Server. In another embodiment, the back end servers are virtualized within a cluster and the ActiveComputerName registry key is set to a virtual name. Within the clustered embodiment, the virtual name given to the back end servers may differ from the name given to the MICROSOFT Exchange Server. After failover of a back end server, the MICROSOFT Exchange database associated with the failed back end server is re-associated with a functioning back end server. The queries supplied by the front end servers are directed to the functioning back end server. Failover of the backend server is accomplished without a need to change the ActiveComputerName registry key.

The present invention provides high availability access to a database 114 independent of the version of the database 114. Independent access to the database 114 is provided by virtualizing access to the database 114. Virtualizing access to the database 114 allows the database 114 to be upgraded or a new version installed without changing the name set in the ActiveComputerName registry key and without a requirement to re-register the ActiveComputerName registry key. The invention functions well with MICROSOFT Exchange.

While the foregoing is directed to embodiments of the present invention, other and further embodiments of the invention may be devised without departing from the basic scope thereof, and the scope thereof is determined by the claims that follow.

The invention claimed is:

1. An apparatus comprising:
a first front end server, wherein
    the first front end server is configured to be coupled to a plurality of clients,
    the first front end server is configured to receive input/output requests from the plurality of clients,
    the input/output requests comprise database access requests directed to a database, and
    the first front end server is configured to provide protocol services that handle the input/output requests;
a first back end server configured to provide database protocol services that handle access to the database wherein,
    the first front end server is coupled to the first back end server;
a second front end server, wherein
    the first front end server is configured to failover to the second front end server, and
    the first front end server and the second front end server are configured to virtualize a registry key of the database;
a second back end server, wherein
    the first back end server is configured to failover to the second back end server,
    the second front end server is coupled to the second back end server,
    failover to the second back end server comprises a failover process,
    the failover process comprises re-associating the database from the first back end server to the second back end server during the failover process,
    the re-associating comprises
        dismounting the database from the first back end server, and
        remounting the database on the second back end server; and
a storage area network configured to store the database, wherein
    the storage area network is configured to be coupled to the first back end server and the second back end server.

2. The apparatus of claim 1, wherein
the first front end server and the second front end server are configured to migrate a system state from the first front end server to the second front end server.

3. The apparatus of claim 2, wherein
the first back end server and the second back end server are configured to re-associate at least one of mailboxes, private databases, public databases, storage groups or transaction logs from the first back end server to the second back end server during the failover process.

4. The apparatus of claim 1, wherein
the protocol services comprise at least one of Simple Mail Transfer Protocol (SMTP), Post Office Protocol 3 (POP3), and Internet Message Access Protocol 4 (IMAP4).

5. The apparatus of claim 1, wherein
the database is Microsoft Exchange.

6. An apparatus comprising:
a first front end server comprising means for implementing protocol services, wherein
    the first front end server is configured to be coupled to a plurality of clients,
    the first front end server is configured to receive input/output requests from the plurality of clients,
    the input/output requests comprise database access requests directed to a database, and
    the protocol services are configured to handle the input/output requests;
a first back end server comprising means for implementing database protocol services, wherein
    the first front end server coupled to the first back end server;
a second front end server, wherein
    the first front end server is configured to failover to the second front end server, and
    the first front end server and the second front end server are configured to virtualize a registry key of the database;
a second back end server, wherein
    the first back end server is configured to failover to the second back end server, and
    the second front end server is coupled to the second back end server;
means for failing over the first front end server to the second front end server comprising
    migrating a system state from the first front end server to the second front end server;
means for re-associating at least one of mailboxes, private databases, public databases, storage groups and transaction logs from the first back end server to the second back end server, wherein
    the re-associating comprises
        dismounting the database from the first back end server, and
        remounting the database on the second back end server; and
a storage area network configured to store a database, wherein
    the storage area network is configured to be coupled to the first back end server and the second back end server.

7. The apparatus of claim 6, wherein
the database is MICROSOFT Exchange.

8. A method comprising:
requesting access to a database through a first front end server, wherein
    the requesting is performed in response to receiving at least one input/output request from a plurality of clients,
    the plurality of clients is configured to be coupled to the first front end server,
    the first front end server is configured to provide protocol services configured to handle the at least one input/output request, the first front end server is configured to failover to a second front end server, and the first front end server and the second front end server are configured to virtualize a registry key of the database;

processing the at least one input/output request in the first front end server using protocol services;

transferring the at least one input/output request to a first back end server, wherein the first back end server is configured to failover to a second back end server, failover to the second back end server comprises a failover process, the failover process comprises re-associating the database from the first back end server to the second back end server during the failover process, the re-associating comprises dismounting the database from the first back end server, and remounting the database on the second back end server; and accessing the database through the second back end server using database protocol services.

9. The method of claim 8, further comprising:

monitoring the first front end server for failure; and migrating a system state from the first front end server to the second front end server in the event of a failure.

10. The method of claim 8, further comprising:

monitoring the first back end server for failure; and the database comprises at least one of mailboxes, private databases, public databases, storage groups or transaction logs from the first back end server to a second back end server in the event of a failure.

11. The method of claim 9, further comprising:

disassociating the plurality of client computers from the first front end server, and re-associating the plurality of client computers with the second front end server.

12. The method of claim 10, further comprising:

disassociating the first front end server from the first back end server and re-associating the first front end server with the second back end server.

13. The method of claim 8, further comprising:

monitoring the first front end server for failure;

in the event of a failure, migrating a system state from the first front end server to the second front end server;

monitoring the first back end server for failure;

in the event of a failure re-associating at least one of mailboxes, private databases, public databases, storage groups and transaction logs from the first back end server to the second back end server;

disassociating the plurality of client computers from the first front end server, and re-associating the plurality of client computers with the second front end server; and associating the second front end server with the second back end server.

* * * * *